Jan. 19, 1965   J. W. GOURLEY, JR   3,165,856
ROLLER GUIDE FOR FISHING RODS
Original Filed Aug. 20, 1959
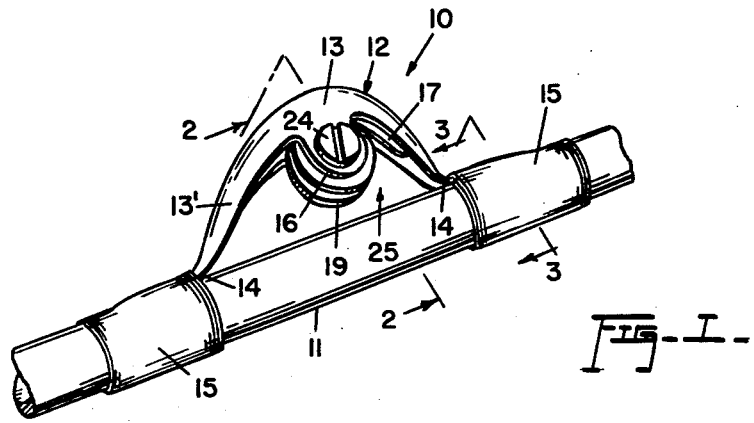
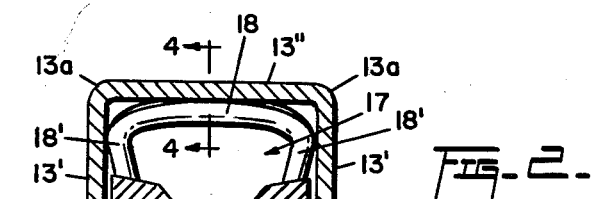
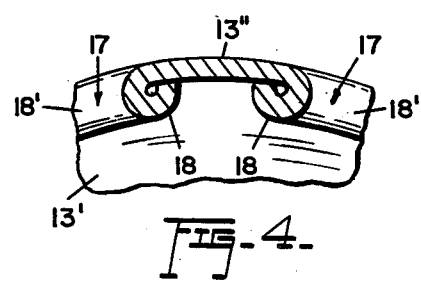
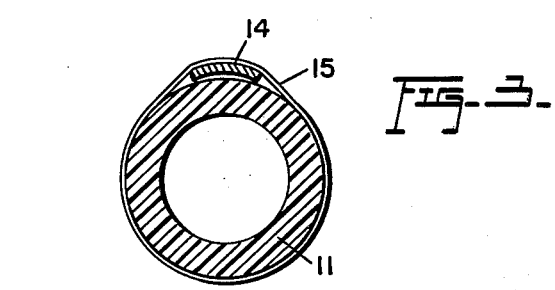
INVENTOR
JAMES W. GOURLEY, JR.
BY *Richard L. Jausewitz*
ATTORNEY

United States Patent Office 3,165,856
Patented Jan. 19, 1965

3,165,856
ROLLER GUIDE FOR FISHING RODS
James W. Gourley, Jr., La Habra, Calif., assignor to Axelson Fishing Tackle Mfg. Co., Newport Beach, Calif., a corporation of California
Original application Aug. 20, 1959, Ser. No. 835,119, now Patent No. 3,091,201, dated May 28, 1963. Divided and this application Mar. 4, 1963, Ser. No. 262,632
3 Claims. (Cl. 43—24)

The application is a division of copending patent application, Serial No. 835,119, filed August 20, 1959, for Roller Guide for Fishing Rods, and Method of Making the Same, now Patent No. 3,091,201, granted May 28, 1963.

This invention relates to a roller guide for fishing rods.

An object of the present invention is to provide a roller guide which is beaded around the openings therein so as not to fray the fish line passing therethrough, which has dished and coined feet to permit rapid non-wobbling mounting thereof onto a fishing rod, which is characterized by extremely low friction relative to the line, and which is so constructed that it is impossible for the line to shift off the roller.

This and other objects and advantages of the invention will be more fully set forth in the folowing specification and claims, considered in connection with the attached drawings to which they relate.

In the drawing:

FIGURE 1 is a perspective view showing the roller guide mounted on a fishing rod;

FIGURE 2 is an enlarged transverse sectional view, taken substantially in the plane of the line 2—2 in FIGURE 1;

FIGURE 3 is an enlarged sectional view, taken substantially in the plane of the line 3—3 in FIGURE 1; and FIGURE 4 is a fragmentary sectional detail, taken substantially in the plane of the line 4—4 in FIGURE 2.

Referring now to the accompanying drawings in detail, the invention comprises a roller-type line guide designated generally by the reference numeral 10, which is adapted to be mounted on a fishing rod 11 at positions spaced from the tip of the rod.

The guide 10 comprises an integral metal frame 12 having a body 13 of a generally U-shaped longitudinal cross-section, with foot portions or feet 14 extending in opposite directions from the opposite ends of the body. The feet 14 lie in substantially a single plane and are adapted to be suitably fastened to the rod 11, as by winding threads 15 around the rod and the feet.

The body 13 has longitudinally curved sides 13′ which generally conform with the U-shaped longitudinal cross-section of the body and extend substantially the entire distance between the feet 14, the side 13′ lying in substantially parallel planes which are perpendicular to the plane of the feet. The side 13′ have depending ear portions or lugs 16 for mounting of roller means hereinafter described. The web 13″ of the body 13 is integral with the sides 13′ at the side edges 13a which are remote from the plane of the feet, as is best shown in FIGURE 2.

The web 13″ is formed with two spaced, elongated openings 17, each opening being encompassed by a return-bent integral bead 18 which extends toward the plane of the feet 14 and is disposed between the openings 17 and the body sides 13′, also as is best shown in FIGURE 2.

The aforementioned roller means comprises a roller 19 rotatably mounted on a tubular bearing 20 which extends between the ear portions or lugs 16 of the body sides 13′, the bearing 20 having a passage 21 therethrough which registers with corresponding holes 22 in the lugs 16, the diameter of the passage being substantially equal to the diameter of the holes 22.

The width of the roller 19 is slightly less than the length of the bearing 20 and an internally screw-threaded tubular pin 23 extends through the holes 22 in the lugs 16 and through the pasage 21 in the bearing 20, the pin 23 having a length less than the distance between the outer surfaces 16′ of the lugs 16 when the inner surfaces 16″ of the lugs are pressed against the ends of the bearing 20. Screws 24 are threaded into the opposite end portions of the pin 23 so as to force the portions or lugs 16 against the ends of the bearing, as will be readily apparent.

The open space 25 provided between the U-shaped of the curved sides 13′ and the plane of the feet 14 is greater than the diameter of the roller 19 so as to permit insertion of the roller into its position through the space 25 without the necessity of springing or bending the sides 13′.

It is to be particularly noted that, as shown in FIGURE 2, the transverse distance between the beaded portions 18′ at the opposite sides of the openings 17 is less than the transverse distance between the body sides 13′, so that a line passing over the roller 19 may engage only the beaded portions 18′ and not the sides 13′. Also, the transverse distance between the beaded portions 18′ is less than the width of the roller 19, whereby the line is prevented by the beaded portions from moving out of engagement with the roller. The return-bent arrangement of the beads 18 effectively prevents the line from fraying in its passage through the openings 17 to and from the roller 19.

Various embodiments of the invention, in addition to what has been illustrated and described in detail, may be employed without departing from the scope of the accompanying claims.

I claim:

1. A roller guide for fishing rods, comprising a metal guide frame having a body of a generally U-shaped longitudinal cross-section and having integral coplanar foot portions at opposite ends of said body, said body being provided with two spaced openings each of which is encompassed by a return-bent beaded portion of said body to prevent fraying of a fishing line passing through said openings, said body having longitudinally curved sides generally conforming with said U-shaped longitudinal cross-section and disposed in spaced generally parallel planes, and at least one roller rotatably mounted between said sides and between said openings whereby a line passing through said openings may pass over said roller for minimization of friction, the open space provided between the U-shape of the curved body sides and the plane of said feet being greater than the diameter of said roller to permit insertion of said roller through said space without the necessity for springing or bending said sides, the transverse distance between said beaded portions at opposite sides of said openings being less than the distance between said sides of said body whereby the stated line may engage only said beaded portions but not the body sides, said transverse distance between said beaded portions being less than the width of said roller whereby said line is prevented by said beaded portions from moving out of engagement with said roller.

2. A roller-type line guide adapted to be mounted on a fishing rod at positions spaced from the tip thereof, said guide comprising an integral metal frame having a body of a generally U-shaped longitudinal cross-section and feet extending in opposite directions from opposite ends of said body, said feet lying in substantially a single plane and being adapted to be mounted on a fishing rod, said body having longitudinally curved sides generally conforming with said U-shaped longitudinal cross-section and extending substantially the entire distance between said feet, said sides having depending lugs adapted to mount roller means, said sides lying in substantially parallel planes perpendicular to the plane of said feet, said body also having a web integral with and extending transversely between said sides at edges of the sides remote from the plane of said feet, said web having two spaced elongated openings formed therein, each of said openings being encompassed by a return-bent integral bead which extends toward the plane of said feet whereby an integral beaded portion is provided between the sides of the opening and the body sides, and roller means mounted between said depending lugs and adapted to receive a line threaded through said openings, the open space provided between the U-shape of the curved body sides and the plane of said feet being greater than the diameter of said roller means to permit insertion of the roller means through said space without the necessity for springing or bending said sides.

3. A roller-type line guide adapted to be mounted on a fishing rod at positions spaced from the tip thereof, said guide comprising an integral metal frame having a body of a generally U-shaped longitudinal cross-section and feet extending in opposite directions from opposite ends of said body, said feet lying in substantially a single plane and being adapted to be mounted on a fishing rod, said body having longitudinally curved sides generally conforming with said U-shaped longitudinal cross-section and extending substantially the entire distance between said feet, said sides having depending lugs adapted to mount roller means, said sides lying in substantially parallel planes perpendicular to the plane of said feet, said body also having a web integral with and extending between said sides at edges of the sides remote from the plane of said feet, said web having two spaced elongated openings formed therein, each of said openings being encompassed by a return-bent integral bead which extends toward the plane of said feet whereby an integral beaded portion is provided between the sides of the opening and the body sides, and roller means mounted between said depending lugs and adaped to receive a line threaded through said openings, the open space provided between the U-shape of the curved body sides and the plane of said feet being greater than the diameter of said roller means to permit insertion of the roller means through said space without the necessity for springing or bending said body sides, said roller means including a roller, a tubular bearing rotatably mounting said roller, said bearing extending between said lugs and having a passage therethrough in register with corresponding holes formed in said lugs, the diameter of said passage being substantially equal to the diameter of said holes, the width of said roller being slightly less than the length of said bearing, an internally screw-threaded tubular pin extending through said holes in said lugs and through said passage in said bearing, said pin having a length less than the distance between the outer surfaces of said lugs when the inner surfaces of the lugs are pressed against the ends of said bearing, and screws threaded into opposite end portions of said pin to force said lugs against the ends of said bearing.

References Cited by the Examiner
UNITED STATES PATENTS

| | | | |
|---|---|---|---|
| 1,603,730 | 10/26 | Wilkinson | 254—192 |
| 2,332,389 | 10/43 | Manney | 254—192 |
| 2,619,714 | 12/52 | Dornaus | 43—24 X |
| 2,878,608 | 3/59 | O'Brien | 43—24 |

FOREIGN PATENTS

| | | |
|---|---|---|
| 1,116,582 | 2/56 | France. |
| 189,898 | 12/22 | Great Britain. |

SAMUEL KOREN, *Primary Examiner.*